United States Patent
Iwanaga (10) Patent No.: US 7,978,961 B2
(45) Date of Patent: Jul. 12, 2011

(54) DISK REPRODUCING APPARATUS

(75) Inventor: Akihiro Iwanaga, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 987 days.

(21) Appl. No.: 11/845,957

(22) Filed: Aug. 28, 2007

(65) Prior Publication Data

US 2008/0050090 A1 Feb. 28, 2008

(30) Foreign Application Priority Data

Aug. 28, 2006 (JP) ................................. 2006-230602

(51) Int. Cl.
H04N 5/783 (2006.01)
(52) U.S. Cl. ........................................ 386/344; 386/346
(58) Field of Classification Search .................. 386/200, 386/344, 346
See application file for complete search history.

(56) References Cited

U.S. PATENT DOCUMENTS
2005/0152683 A1* 7/2005 Ryu ................................. 386/95

FOREIGN PATENT DOCUMENTS
| JP | 2001-126380 A | 5/2001 |
| JP | 2003-235014 A | 8/2003 |
| JP | 2004-241051 A | 8/2004 |
| JP | 2005-71551 A | 3/2005 |

* cited by examiner

Primary Examiner — Huy T Nguyen
(74) Attorney, Agent, or Firm — Crowell & Moring LLP

(57) ABSTRACT

Disclosed a disk reproducing apparatus including: a reproduction control unit; a repeat section setting unit; a repeat reproduction control unit; a special reproduction control unit; and an on-screen display unit, wherein the repeat section setting unit sets time information at the repeat starting point and the repeat ending point, and stores image data at the repeat starting point and/or the repeat ending point; the special reproduction control unit performs special reproduction by skipping I pictures included in the image data at a predetermined time interval; and when the special reproduction reaches the end point of the repeat section, the special reproduction control unit makes the on-screen display unit display the image based on the image data at the repeat starting point or the repeat ending point.

5 Claims, 5 Drawing Sheets

DISK REPRODUCING APPARATUS

BACKGROUND OF THE INVENTION

1. Field of the Invention

The present invention relates to a disk reproducing apparatus capable of reproducing image data recorded on a disk-shaped recording medium, such as a digital versatile disk (DVD), and more particularly to a disk reproducing apparatus including an A-B repeat reproduction function.

2. Description of Related Art

In recent years, disk-shaped recording media, such as the DVDs, having large capacities have been rapidly developed, and the image data recorded on the DVDs is reproduced by a disk reproducing apparatus. Moreover, a Moving Picture Coding Expert Group (MPEG) compressing technique is generally used for recoding digital image data onto a DVD.

In the MPEG compressing technique, the processing at the time of coding, reproducing, and editing is performed by a group called as a video object unit (VOBU). Incidentally, one VOBU is sometimes treated as one group of pictures (GOP).

Now, the image data in a VOBU is generally composed of three kinds of pictures of I/P/B pictures, and each frame in the VOBU is distributed to any of the I picture, the P picture, and the B picture to be coded.

Hereupon, the I picture indicates a screen capable of being compressed using only the information in its own screen without using the correlated information of the other screens before and after the screen in time, and the compression similar to the compression of the Joint Photographic Experts Group (JPEG) is performed to the I picture as a still image (intra-frame encoding). Moreover, the P picture indicates a screen expressed by the correlated information from a past screen in time, and is coded by referring to a past I picture or a past P picture (forward prediction). Moreover, the B picture indicates a screen expressed by the correlated information from before and after screens in time, and is coded by referring to an I picture or a P picture (both-direction prediction).

At the time of the reproduction of image data having such a configuration, the I picture is first reconstructed, and then the P picture and the B picture are reconstructed on the basis of the I picture.

On the other hand, if fast-forward reproduction or fast-backward reproduction is performed by a disk reproducing apparatus, a method of only reproducing (displaying) the I pictures is general (the P pictures can be also used for the fast-forward reproduction). That is, in the fast-forward reproduction and the fast-backward reproduction, I pictures before (past) and after (future) predetermined times are sequentially displayed. For example, an I picture before or after a predetermined number of VOBUs by the VOBU (e.g., the first I picture at the VOBU) is displayed.

Furthermore, some disk reproducing apparatus include the A-B repeat reproduction function of setting a repeat starting point (point A) and a repeat ending point (point B) with an input unit of a remote control apparatus or the like during the reproduction of image data, and of repeating reproduction in the A-B section.

For example, Japanese Patent Application Laid-Open Publications No. 2004-241051, No. 2003-235014, No. 2005-071551, and No. 2001-126380 disclose techniques pertaining to the A-B repeat reproduction.

Now, the fast-forward reproduction and the fast-backward reproduction can be executed even during the A-B repeat reproduction, and the I pictures are displayed at predetermined time intervals (e.g. at each time of skipping two VOBUs) also in this case.

Figure 5A:
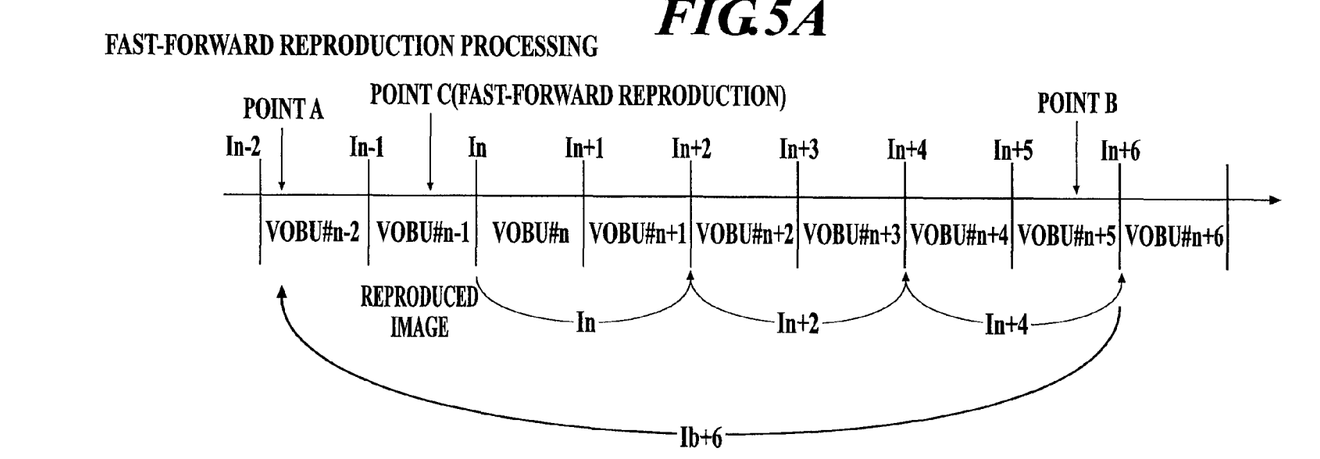
FIGS. 5A and 5B are explanatory diagrams showing fast-forward reproduction processing and fast-backward reproduction processing, respectively, at the time of A-B repeat reproduction by a conventional disk reproducing apparatus.
Figure 5B:
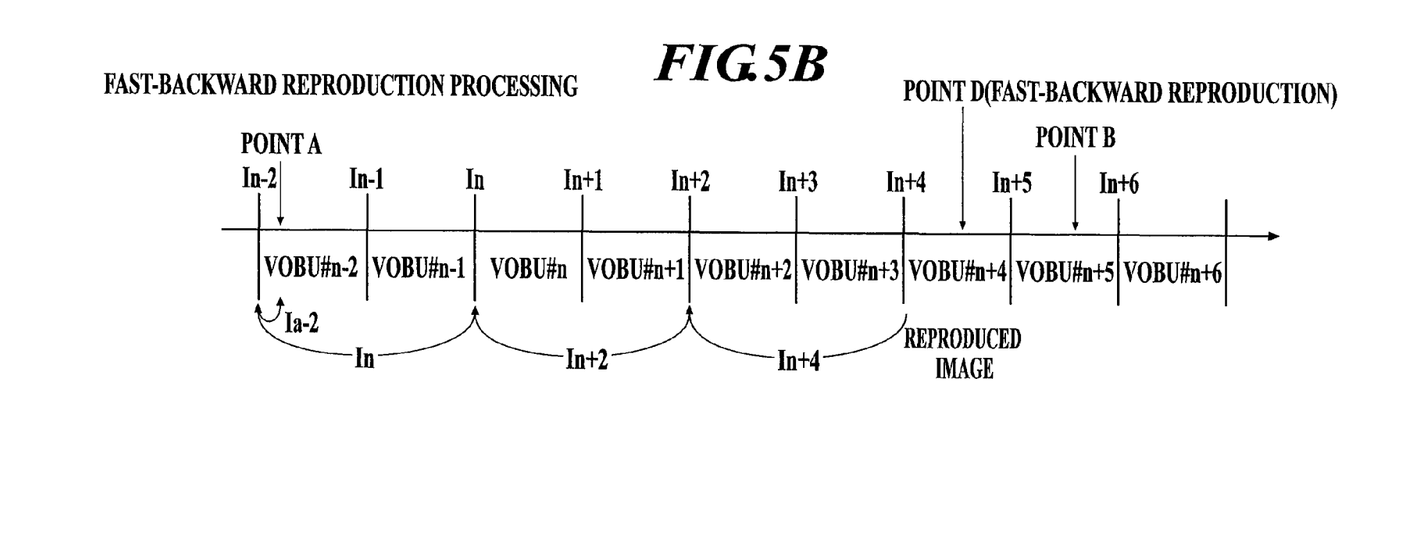

FIGS. 5A and 5B are explanatory diagrams showing fast-forward reproduction processing and fast-backward reproduction processing, respectively, at the A-B repeat reproduction, and the FIGS. 5A and 5B show the case where the point A (repeat starting point) is set in VOBU #n−2 reproduction and the point B (repeat ending point) is set in VOBU #n+5 reproduction. Incidentally, although the FIGS. 5A and 5B show the case where the first I picture in each VOBU is reproduced in both of the fast-forward reproduction and the fast-backward reproduction for simplifying the description, there are the cases where the I pictures in the inner parts of the VOBUs are reproduced.

For example, as shown in FIG. 5A, if the fast-forward reproduction (e.g. skipping two VOBUs) is instructed at a point C where the image data in VOBU #n−1 is being reproduced by the A-B repeat reproduction, then the I pictures are reproduced in the order of the first I picture I, in VOBU #n, the first I picture $I_{n+2}$ in VOBU #n+2, . . . . Then, when the first I picture $I_{n+6}$ in VOBU #n+6 is reproduced, it is judged that the fast-forward reproduction has been performed to the point B, and the reproduction returns to the point A to repeat the A-B repeat reproduction. At this time, the judgment of the arrival of the fast-forward reproduction at the point B is performed on the basis of the time information of the point B and the reproduced time information of the I pictures. Consequently, the arrival of the fast-forward reproduction at the point B cannot be judged until the I picture $I_{n+6}$, which has passed the point B, is reproduced. Consequently, during the period of from the time when the judgment of the arrival of the fast-forward reproduction at the point B has been made to the time when the fast-forward reproduction returns to the point A, the I picture $I_{n+6}$, which is an image out of the A-B section, is being displayed.

Moreover, as shown in FIG. 5B, if the fast-backward reproduction (e.g. skipping two VOBUs) is instructed at a point D where the image data in VOBU #n+4 is being reproduced by the A-B repeat reproduction, then the I pictures are reproduced in the order of the first I picture $I_{n+4}$ in the VOBU #n+4, the first I picture $I_{n+2}$ in VOBU #n+2, . . . . Then, when the first I picture $I_{n-2}$ in VOBU#n−2 is reproduced, it is judged that the fast-backward reproduction has been performed to the point A, and the reproduction returns to the point A to repeat the A-B repeat reproduction. Consequently, also in the first-backward reproduction, during the period to the time when the fast-backward reproduction returns to the point A, the I picture $I_{n-2}$, which is an image out of the A-B section, is similarly being displayed.

In this manner, if the image data corresponding to the points A and B set in A-B repeat reproduction is not the first I picture of each VOBU, the images out of the A-B section are displayed during the period of from the time when the fast-forward reproduction or the fast-backward reproduction has passed an end point of the A-B section (point A or point B) to the time when the processing returns to the point A. Consequently, there is the possibility that the display of the images out of the set section may make a user uncomfortable.

SUMMARY OF THE INVENTION

It is, therefore, a main object of the present invention to provide a disk reproducing apparatus capable of preventing the display of images out of a set repeat section in the case where special reproduction processing (fast-forward reproduction and fast-backward reproduction) is executed during A-B repeat reproduction.

According to a first aspect of the present invention, there is provided a disk reproducing apparatus including: a reproduction control unit to control reproduction processing of image data recorded on a disk-shaped recording medium; a repeat section setting unit to set a repeat starting point (point A) and a repeat ending point (point B) of a repeat section (A-B section) based upon an input of an instruction signal from an input unit during the reproduction processing of the image data; a repeat reproduction control unit to perform repeat reproduction by repeatedly reproducing the image data in the repeat section (A-B section); a special reproduction control unit to control fast-forward reproduction and fast-backward reproduction during the repeat reproduction by the repeat reproduction control unit; and an on-screen display unit capable of displaying a sub-image, by superimposing the sub-image onto a main image, wherein the repeat section setting unit sets time information at the repeat starting point (point A) and the repeat ending point (point B), and stores image data of the repeat starting point (point A) and the repeat ending point (point B), the special reproduction control unit performs special reproduction by reproducing I pictures included in the image data while skipping the I pictures at a predetermined time interval, the special reproduction control unit judges whether the special reproduction reaches an end point (point A or point B) of the repeat section (A-B section) set by the repeat section setting unit or not based upon time information of reproduced I pictures and the time information of the repeat starting point (point A) or the repeat ending point (point B), if an I picture reproduced in the fast-forward reproduction exceeds the repeat ending point (point B), then the special reproduction control unit reproduces the I picture, and makes the on-screen display unit display an image based on the image data at the repeat ending point (point B), and if an I picture reproduced in the fast-backward reproduction exceeds the repeat starting point (point A) then the special reproduction control unit reproduces the I picture, and makes the on-screen display unit display an image based on the image data at the repeat starting point (point A).

According to a second aspect of the present invention, there is provided a disk reproducing apparatus including: a reproduction control unit to control reproduction processing of image data recorded on a disk-shaped recording medium; a repeat section setting unit to set a repeat starting point (point A) and a repeat ending point (point B) of a repeat section (A-B section) based upon an input of an instruction signal from an input unit during the reproduction processing of the image data; a repeat reproduction control unit to perform repeat reproduction by repeatedly reproducing the image data in the repeat section (A-B section) set by the repeat section setting unit; a special reproduction control unit to control fast-forward reproduction and fast-backward reproduction during the repeat reproduction by the repeat reproduction control unit; and an on-screen display unit capable of displaying a sub-image, by superposing the sub-image onto a main image, wherein the repeat section setting unit sets time information at the repeat starting point (point A) and the repeat ending point (point B), and stores image data at the repeat starting point (point A) and/or the repeat ending point (point B), the special reproduction control unit performs special reproduction by reproducing I pictures included in the image data while skipping the I pictures at a predetermined time interval, and when the special reproduction reaches an end point of the repeat section (point A or point B), the special reproduction control unit makes the on-screen display unit display an image based on the image data at the repeat starting point (point A) or the repeat ending point (point B).

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

Figure 1:
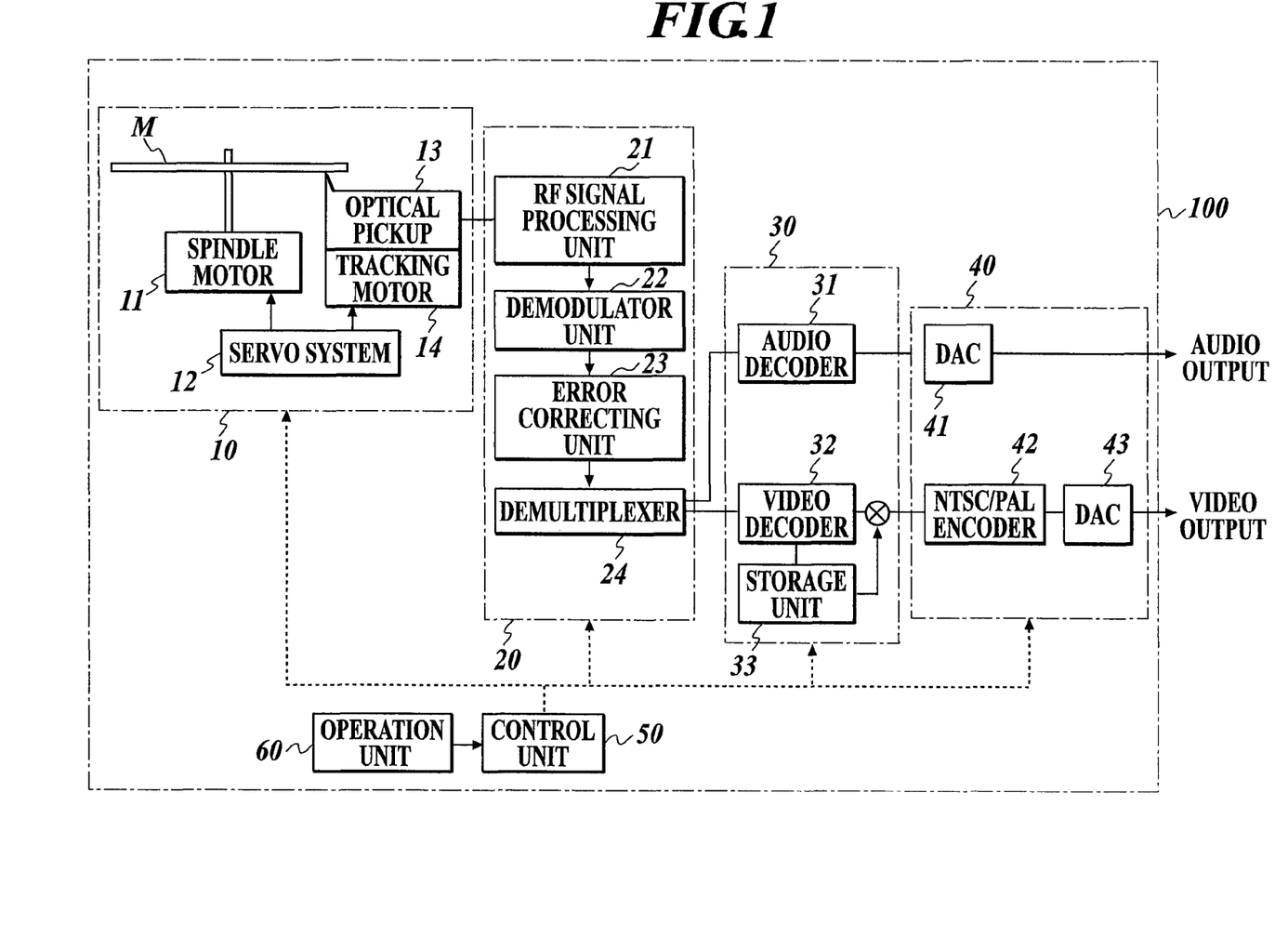
FIG. 1 is a block diagram showing the configuration of a DVD recorder according to an embodiment of the present invention.

In the following, embodiments of the present invention will be described with reference to the attached drawings. FIG. 1 is a block diagram of a DVD player 100 as an embodiment of a disk reproducing apparatus according to the present invention.

The DVD player 100 of the present embodiment includes a disk drive 10 for reading data from a disk-shaped recording medium, such as a DVD, a digital signal processing unit 20 converting a radio frequency (RF) signal obtained by the disk drive 10 into predetermined digital data, a decode unit 30 reconstructing processed compressed data by expanding the compressed data, an output unit 40, a control unit 50, and an operation unit 60.

The disk drive 10 includes a spindle motor 11, an optical pickup 13, a tracking motor 14, and a servo system 12. The spindle motor 11 rotates a disk-shaped recording medium M, such as a DVD. The tracking motor 14 operates the optical pickup 13, and the optical pickup 13 reads the data recorded on the disk-shaped recording medium M. To put it concretely, the optical pickup 13 radiates a predetermined laser light to the disk-shaped recording medium M, and receives a reflected light.

The digital signal processing unit 20 includes an RF signal processing unit 21, a demodulator unit 22, an error correcting unit 23, and a demultiplexer 24. The RF signal processing unit 21 converts a waveform signal (RF signal) of a reflected light received by the optical pickup 13 into digital data. The demodulator unit 22 demodulates the digital data, which is record-coded by a predetermined modulation method (e.g., $8/16$ modulation), into the original data thereof. The error correcting unit 23 performs the error correction of demodulated data by a predetermined error correction method (e.g., Reed-Solomon Product-like Code (RS-PC) method). The demultiplexer 24 segregates the digital data processed by the error correcting unit 23 into image data, caption data, and audio data (stream segregation).

The decode unit 30 includes an audio decoder 31 and a video decoder 32. The audio decoder 31 expands audio data compressed by a predetermined method (e.g., Dolby AC-3 system) to reconstruct the compressed audio data to the original state thereof. The video decoder 32 expands image data compressed by a predetermined method (e.g., Moving Picture Expert Group phase 2 (MPEG-2) system) to reconstruct the image data to the original state.

Moreover, if a point A and a point B are set by A-B repeat setting processing, which will be described later, then the image data at the points A and B, which data has been reconstructed by the video decoder 32, is stored in a storage unit 33. The image data at the point A or B, which data is stored in the storage unit 33, is on-screen-displayed to be superimposed on a main image when special reproduction (fast-forward reproduction or fast-backward reproduction) in the A-B repeat reproduction reaches an end point (point A or point B) (on-screen display unit).

The output unit 40 includes an NTSC/PAL encoder 42 and D/A converters 41 and 43. The D/A converter 41 analog-converts an audio signal reconstructed by the audio decoder 31 (e.g., linear pulse code modulation (PCM)), and outputs the converted analog signal. The NTSC/PAL encoder 42 encodes a video signal reconstructed by the video decoder 32 or a video signal composed with on-screen display (OSD) data (image data at the point A or B) into the data of the national television system committee (NTSC) system or the phase alternation by line (PAL) system in order that the video signal can be seen on a television receiver. The D/A converter 43 converts the digital data encoded by the NTSC/PAL encoder 42 into an analog signal to output the analog signal.

The control unit 50 includes a central processing unit (CPU) performing the control of each block and predetermined operations to control the operation of the DVD player 100, a random access memory (RAM) used as the working memory of the CPU, and a read only memory (ROM) storing control programs to be executed by the CPU and the like.

The operation unit 60 can input an instruction signal for setting a repeat starting point (point A) and a repeat ending point (point B) of A-B repeat reproduction into the control unit 50, and is composed of, for example, an operation panel of the apparatus main body or a remote control apparatus.

The DVD player 100 of the present embodiment has the A-B repeat reproduction function of repeatedly reproducing the repeat section (A-B section) when the repeat starting point (point A) and the repeat ending point (point B) are set by the operation unit 60 during the reproduction of image data.

That is, the control unit 50 functions as a reproduction control unit to control the reproduction processing of the image data recorded on a DVD, a repeat section setting unit to set a repeat starting point (point A) and a repeat ending point (point B), a repeat reproduction control unit to perform repeat reproduction by repeatedly reproducing the image data in a set repeat section, and as a special reproduction control unit to control fast-forward reproduction or fast-backward reproduction in A-B repeat reproduction based upon an instruction signal input from the operation unit 60 during reproduction processing of image data.

Figure 2A:
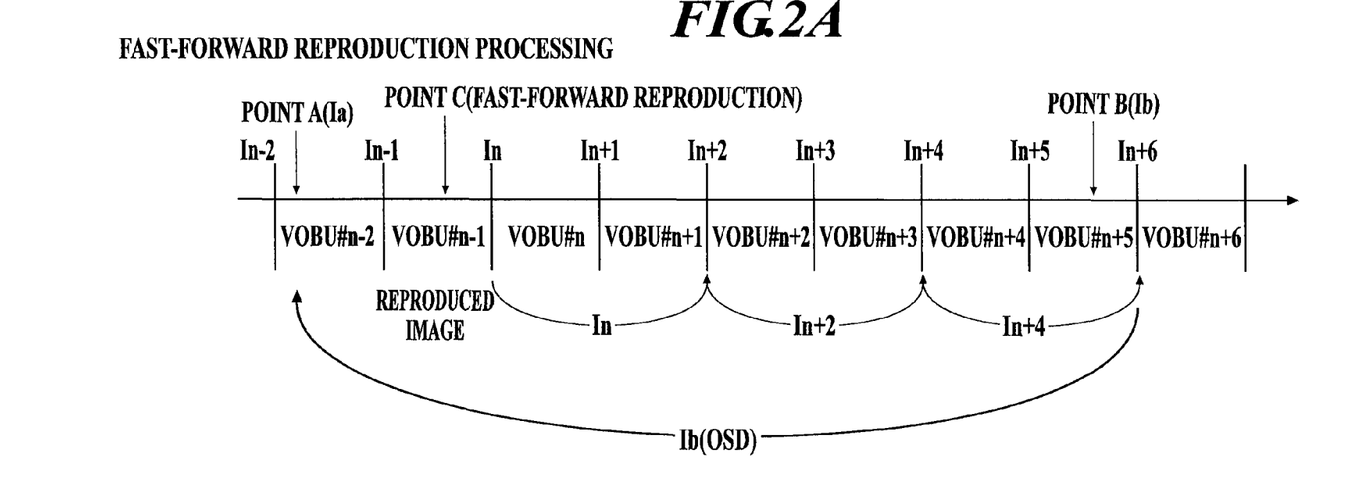
FIGS. 2A and 2B are explanatory diagrams showing fast-forward reproduction processing and fast-backward reproduction processing, respectively, at the time of A-B repeat reproduction of a disk reproducing apparatus according to the present invention.
Figure 2B:
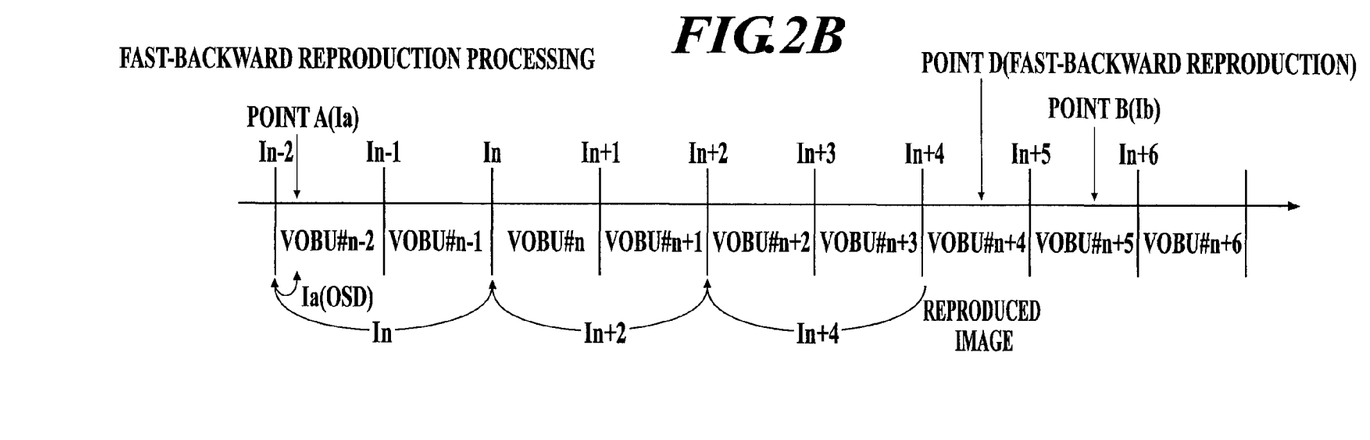

Next, special reproduction processing at the time of A-B repeat reproduction is described with reference to FIGS. 2-4. The FIGS. 2A and 2B are explanatory diagrams showing fast-forward reproduction processing and fast-backward reproduction processing, respectively, at the time of A-B repeat reproduction. Incidentally, although the FIGS. 2A and 2B show the case where the first I picture of each VOBU is reproduced in the fast-forward reproduction and the fast-backward reproduction for simplifying the description, there are the cases where the I pictures in the internal part of each VOBU are reproduced.

Figure 3:
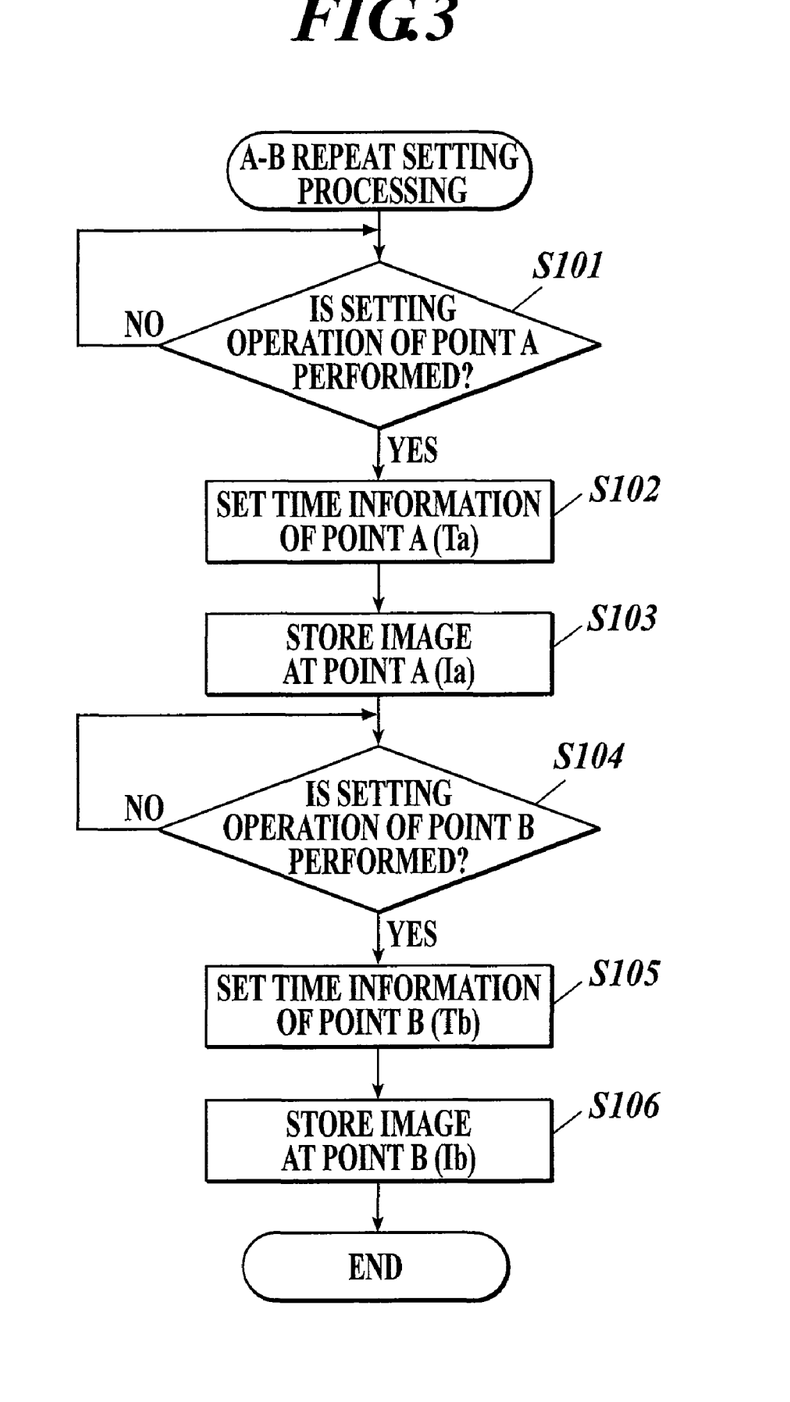
FIG. 3 is a flow chart showing the A-B repeat setting processing executed by a control unit 50 as a repeat section setting unit.

Moreover, FIG. 3 is a flow chart showing the A-B repeat setting processing executed by the control unit 50 as the repeat section setting unit. FIG. 4 is a flow chart showing the A-B repeat reproduction processing executed by the control unit 50 as the repeat reproduction control unit and the special reproduction control unit.

First, at Step S101 in FIG. 3, it is judged whether an operation for setting a repeat starting point (point A) is performed or not. If it is judged that the setting processing of the point A is performed, then the time information $T_a$ of the point A is set (Step S102), and the image data $I_a$ of the point A is stored in the storage unit 33 (Step S103). FIGS. 2A and 2B show the case where the point A is set in the reproduction of VOBU #n−2.

Next, at Step S104, it is judged whether an operation of setting a repeat ending point (point B) is performed or not. If it is judged that the setting operation of the point B is performed, the time information $T_b$ of the point B is set (Step S105), and the image data $I_b$ at the point B is stored into the storage unit 33 (Step S106). FIGS. 2A and 2B show the case where the point B is set in the reproduction of VOBU #n+5.

By the A-B repeat setting processing mentioned above, the repeat section is set. Incidentally, the image data at the points A and B may be any of an I picture, a P picture, and a B picture.

Figure 4:
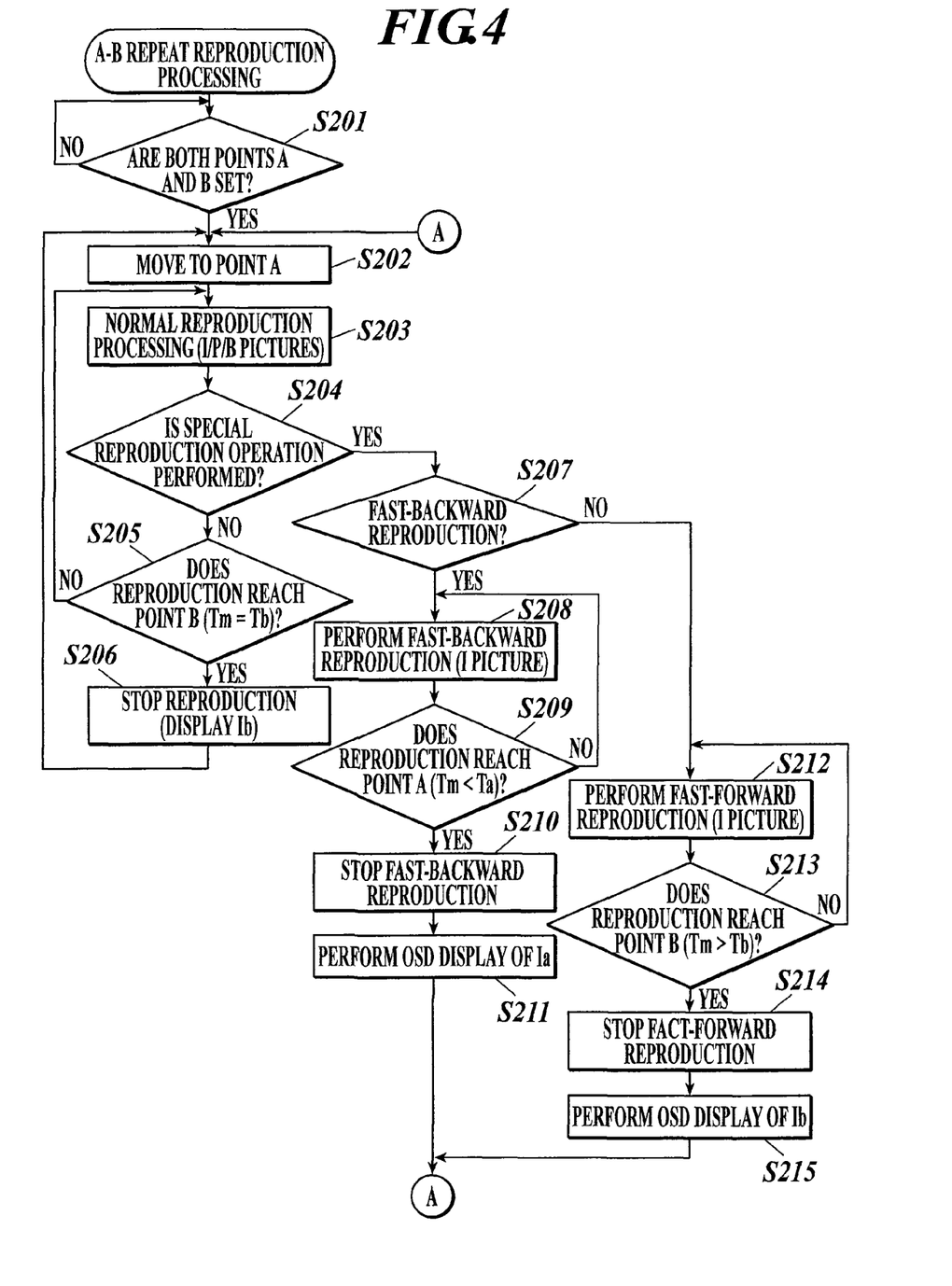
FIG. 4 is a flow chart showing A-B repeat reproduction processing executed by the control unit 50 as a repeat reproduction control unit and as a special reproduction control unit.

Next, at Step S201 of FIG. 4, it is judged whether the points A and B are set by the A-B repeat setting processing or not. If it is judged that both of the points A and B are set, the processing moves to the point A on the basis of the time information $T_a$ of the point A (Step S202), and normal reproduction processing (A-B repeat reproduction) is executed (Step S203). By the normal A-B repeat reproduction processing, the image data of the I/P/B pictures included in each VOBU is sequentially reproduced. For example, an I picture is first reconstructed; a P picture is then reconstructed on the basis of the I picture; a B picture is finally reconstructed on the basis of the I picture and the P picture; thus each of the I/P/B pictures are reproduced.

Next, it is judged whether an instruction signal of special reproduction (fast-forward reproduction or fast-backward reproduction) is input from the operation unit 60 or not during the A-B repeat reproduction. If it is judged that the instruction signal of the special reproduction is input, then the processing shifts to Step S207. If it is judged that the instruction signal of the special reproduction is not input, then the processing shifts to Step S205.

At the Step S205, it is judged whether the normal A-B repeat reproduction reaches the point B or not. For example, it is judged whether the reproduction reaches the point B or not on the basis of the time information $T_b$ of the point B and the time information $T_m$ of the image data to be reproduced. If it is judged that the reproduction reaches the point B, then the reproduction is stopped (Step S206), and the processing shifts to Step S202 to repeat the A-B repeat reproduction processing from the point A. Incidentally, during the period of from the stop of the reproduction at the Step S206 to the return to the point A, the image based on the image data $I_b$ at the point B is displayed.

At the Step S207, it is judged whether the instructed special reproduction is the fast-backward reproduction or the fast-forward reproduction. If it is judged that the instructed special reproduction is the fast-backward reproduction, then the processing shifts to Step S208 to perform the fast-backward reproduction processing. In the fast-backward reproduction processing, the I pictures included in the image data are skipped at a predetermined time interval (for example, skipping of two VOBUs) in reading, and the read I pictures are reproduced. For example, as shown in FIG. 2B, if the fast-backward reproduction is instructed at the point D where the image data in VOBU #n+4 is being reproduce by the A-B repeat reproduction, then the I pictures are reproduced in the order of the first I picture $I_{n+4}$ of the VOBU #n+4, the first I picture $I_{n+2}$ of VOBU #n+2, . . . .

Next, at Step S209, it is judged whether the fast-backward reproduction reaches the point A or not. At this time, it is judged whether the fast-backward reproduction has reached the point A or not on the basis of the time information $T_m$ of the I pictures to be reproduced and the time information $T_a$ of the point A. For example, as shown in FIG. 2B, if the time information $T_{n-2}$ of the first I picture $I_{n-2}$ of VOBU #n–2 is compared with the time information $T_a$ of the point A, then the time information $T_a$ is larger than the time information $T_{n-2}$. Consequently, it can be judged that the fast-backward reproduction reaches the point A.

At the Step S209, if it is judged that the fast-backward reproduction reaches the point A, then the fast-backward reproduction is stopped (Step S210), and the image based on the image data $I_a$ at the point A is on-screen-displayed (Step S211). After that, the processing shifts to the Step S202, and repeats the A-B repeat reproduction processing from the point A. Incidentally, during the period of from the time when the fast-backward reproduction is stopped at the forefront of the VOBU #n–2 (at the position of the first I picture $I_{n-2}$) to the time when the reproduction returns to the point A, the image based on the image data $I_a$ at the point A is displayed. That is, because the image data $I_a$ is displayed on the screen, although the first I picture $I_{n-2}$ is being reproduced as the main image, the user cannot observes the first I picture $I_{n-2}$.

On the other hand, if it is judged that the instructed special reproduction is the fast-backward reproduction at the Step S207, the processing shifts to Step S212, and the fast-forward reproduction processing is performed. In the fast-forward reproduction processing, the I pictures included in the image data are skipped at a predetermined time interval (for example, skipping of two VOBUs) in reading, and the read I Pictures are reproduced. For example, as shown in FIG. 2A, if the fast-forward reproduction is instructed at the point C where the image data of VOBU #n–1 is reproduced by the A-B repeat reproduction, then the I pictures are reproduced in the order of the first I picture $I_n$ of VOBU #n, the first I picture $I_{n+2}$ of VOBU #n+2, . . . .

Next, at Step S213, it is judged whether the fast-forward reproduction reaches the point B or not. At this time, it is judged whether the fast-forward reproduction reaches the point B or not on the basis of the time information $T_m$ of the I pictures to be reproduced and the time information $T_b$ of the point B. For example, as shown in FIG. 2A, if the time information $T_{n+6}$ of the first I picture $I_{n+6}$ in the VOBU #n+6 is compared with the time information $T_b$ of the point B, then the time information $T_b$ is smaller than the time information $T_{n+6}$. Consequently, it can be judged that the fast-forward reproduction reaches the point B.

If it is judged at the Step S213 that the fast-forward reproduction reaches the point B, then the fast-forward reproduction is stopped (Step S214), and the image based on the image data $I_b$ at the point B is on-screen-displayed (Step S215). After that, the processing shifts to the Step S202, and the A-B repeat reproduction processing is repeated from the point A. Incidentally, during the period of from the time when the fast-forward reproduction is stopped at the forefront of the VOBU n+6 (the time when the first I picture $I_{n+6}$ is reproduced) to the time when the fast-forward reproduction returns to the point A, the image based on the image data $I_b$ at the point B is displayed. That is, although the first I picture $I_{n+6}$ is being reproduced as the main image, the I picture $I_b$ is displayed on the screen. Consequently, the user cannot observe the first I picture $I_{n+6}$.

As described above, in the DVD player 100 of the present embodiment, the time information $T_a$ and $T_b$ of the point A (repeat starting point) and the point B (repeat ending point), respectively, are set on the basis of the instruction signal from the operation unit 60, and the image data $I_a$ and $I_b$ at the points A and B, respectively, are stored. If the special reproduction (fast-forward reproduction or fast-backward reproduction) in A-B repeat reproduction reaches an end point (point A or point B) of the repeat section, then the image based on the image data $I_a$ or $I_b$ at the point A or B, respectively, is on-screen-displayed.

Thereby, because it is prevented that an image out of the repeat section set by a user is displayed in the special reproduction in the A-B repeat reproduction, it is prevented that the display of the image out of the set repeat section makes the user uncomfortable.

In the above, the invention devised by the inventor of the present invention has been concretely described on the basis of an embodiment, but the present invention is not limited to the above embodiment. The present invention can be changed without departing from the scope thereof.

For example, although the aforesaid embodiment judges whether the special reproduction reaches an end point of a repeat section or not on the basis of the time information of the I pictures to be reproduced and the time information of the point A or B, it may be judged whether the special reproduction reaches an end point of a repeat section or not by estimating the time information of the I picture to be reproduced next from the time information of the I picture that is currently being reproduced and the time to be skipped in reading by the special reproduction (for example, two VOBU=about one sec). Because it can be thereby judged whether the reproduction processing reaches an end point of the repeat section or not before the reproduction of the next I picture, the image of the point A or B can be smoothly on-screen-displayed if the reproduced I picture passes through the end point of the repeat section.

Moreover, although the aforesaid embodiment displays the image based on the image data at the point B when the fast-forward reproduction reaches the point B, the image based on the image data of the point A may be displayed even if the fast-forward reproduction reaches the point B. That is, because the A-B repeat reproduction is performed by returning the reproduction to the point A even if the fast-forward reproduction reaches the point B, a user does not have an uncomfortable feeling even if the image at the point A is being displayed as a sub-image before the image at the point A is reproduced as the main image.

Moreover, if a cancelling operation of the A-B repeat reproduction is input, the set repeat section may be canceled, and normal reproduction processing may be performed from the time point. Moreover, if a cancelling operation of the special reproduction operation in the A-B repeat reproduction is input, the A-B repeat reproduction processing may be performed from the time point, or the set repeat section may be canceled and the normal reproduction processing may be performed from the time point.

According to an aspect of the preferred embodiments of the present invention, there is provided a disk reproducing apparatus including: a reproduction control unit to control reproduction processing of image data recorded on a disk-shaped recording medium; a repeat section setting unit to set a repeat starting point (point A) and a repeat ending point (point B) of a repeat section (A-B section) based upon an input of an instruction signal from an input unit during the reproduction processing of the image data; a repeat reproduction control unit to perform repeat reproduction by repeatedly reproducing the image data in the repeat section (A-B section) set by the repeat section setting unit; a special reproduction control unit to control fast-forward reproduction and fast-backward reproduction during the repeat reproduction by the repeat reproduction control unit; and an on-screen display unit capable of displaying a sub-image, by superposing the sub-image onto a main image, wherein the repeat section setting unit sets time information at the repeat starting point (point A) and the repeat ending point (point B), and stores image data at the repeat starting point (point A) and/or the repeat ending point (point B) the special reproduction control unit performs special reproduction by reproducing I pictures included in the image data while skipping the I pictures at a predetermined time interval, and when the special reproduction reaches an end point of the repeat section (point A or point B), the special reproduction control unit makes the on-screen display unit display an image based on the image data at the repeat starting point (point A) or the repeat ending point (point B).

Preferably, the special reproduction control section judges whether the special reproduction reaches the end point (point A or point B) of the repeat section (A-B section) or not based upon time information of reproduced I pictures and the time information of the repeat starting point (point A) or the repeat ending point (point B), and if a reproduced I picture exceeds the repeat section (A-B section), then the special reproduction control unit reproduces the I picture, and makes the on-screen display unit display the image based on the image data at the repeat starting point (point A) or the repeat ending point (point B) by superimposing the image onto the I picture.

Preferably, the special reproduction control unit estimates time information of an I picture to be reproduced next based upon time information of an I picture currently reproduced and the predetermined time interval to be skipped in the special reproduction, and thereby judges whether the special reproduction reaches the end point (point A or point B) of the repeat section (A-B section) or not.

Preferably, when the fast-forward reproduction reaches the repeat ending point (point B), the special reproduction control unit makes the on-screen display unit display the image based on the image data at the repeat ending point (point B), and when the fast-backward reproduction reaches the repeat starting point (point A), the special reproduction control unit makes the on-screen display unit display the image based on the image data at the repeat starting point (point A).

According to the embodiments of the present invention, the disk reproducing apparatus having the A-B repeat reproduction function sets the time information of the point A (repeat starting point) and the point B (repeat ending point) on the basis of the instruction signal from the input unit, and stores the image data at the points A and/or B. When the special reproduction (fast-forward reproduction or fast-backward reproduction) during the A-B repeat reproduction reaches the end point of the repeat section (A-B section), the disk reproducing apparatus on-screen-displays the image based on the image data at the point A or B. Consequently, images out of the repeat section, which a user has set, do not displayed, and it can be prevented that the display of the images out of the set repeat section makes the user uncomfortable.

The entire disclosure of Japanese Patent Application No. 2006-230602 filed on Aug. 28, 2006, including description, claims, drawings and summary are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:
1. A disk reproducing apparatus, comprising:
a reproduction control unit to control reproduction processing of image data recorded on a disk-shaped recording medium;
a repeat section setting unit to set a repeat starting point and a repeat ending point of a repeat section based upon an input of an instruction signal from an input unit during the reproduction processing of the image data;
a repeat reproduction control unit to perform repeat reproduction by repeatedly reproducing the image data in the repeat section;
a special reproduction control unit to control fast-forward reproduction and fast-backward reproduction during the repeat reproduction by the repeat reproduction control unit; and
an on-screen display unit capable of displaying a sub-image, by superimposing the sub-image onto a main image, wherein
the repeat section setting unit sets time information at the repeat starting point and the repeat ending point, and stores image data of the repeat starting point and the repeat ending point,
the special reproduction control unit performs special reproduction by reproducing I pictures included in the image data while skipping the I pictures at a predetermined time interval,
the special reproduction control unit judges whether the special reproduction reaches an end point of the repeat section set by the repeat section setting unit or not based upon time information of reproduced I pictures and the time information of the repeat starting point or the repeat ending point,
if an I picture reproduced in the fast-forward reproduction exceeds the repeat ending point, then the special reproduction control unit reproduces the I picture, and makes the on-screen display unit display an image based on the image data at the repeat ending point, and
if an I picture reproduced in the fast-backward reproduction exceeds the repeat starting point, then the special reproduction control unit reproduces the I picture, and makes the on-screen display unit display an image based on the image data at the repeat starting point.
2. A disk reproducing apparatus, comprising:
a reproduction control unit to control reproduction processing of image data recorded on a disk-shaped recording medium;
a repeat section setting unit to set a repeat starting point and a repeat ending point of a repeat section based upon an input of an instruction signal from an input unit during the reproduction processing of the image data;
a repeat reproduction control unit to perform repeat reproduction by repeatedly reproducing the image data in the repeat section set by the repeat section setting unit;
a special reproduction control unit to control fast-forward reproduction and fast-backward reproduction during the repeat reproduction by the repeat reproduction control unit; and
an on-screen display unit capable of displaying a sub-image, by superposing the sub-image onto a main image, wherein
the repeat section setting unit sets time information at the repeat starting point and the repeat ending point, and stores image data at the repeat starting point and/or the repeat ending point, the special reproduction control unit performs special reproduction by reproducing I pictures included in the image data while skipping the I pictures at a predetermined time interval, and when the special reproduction reaches an end point of the repeat section, the special reproduction control unit makes the on-screen display unit display an image based on the image data at the repeat starting point or the repeat ending point.

3. The disk reproducing apparatus according to claim 2, wherein the special reproduction control unit judges whether the special reproduction reaches an end point of the repeat section or not based upon time information of reproduced I pictures and the time information of the repeat starting point or the repeat ending point, and if a reproduced I picture exceeds the repeat section, then the special reproduction control unit reproduces the I picture, and makes the on-screen display unit display the image based on the image data at the repeat starting point or the repeat ending point, by superimposing the image onto the I picture.

4. The disk reproducing apparatus according to claim 3, wherein the special reproduction control unit estimates time information of an I picture to be reproduced next based upon time information of an I picture currently reproduced and the predetermined time interval to be skipped in the special reproduction, and thereby judges whether the special reproduction reaches the end point of the repeat section or not.

5. The disk reproducing apparatus according to claim 2, wherein when the fast-forward reproduction reaches the repeat ending point, the special reproduction control unit makes the on-screen display unit display the image based on the image data at the repeat ending point, and when the fast-backward reproduction reaches the repeat starting point, the special reproduction control unit makes the on-screen display unit display the image based on the image data at the repeat starting point.

* * * * *